(12) United States Patent
Bell

(10) Patent No.: US 6,445,921 B1
(45) Date of Patent: *Sep. 3, 2002

(54) CALL RE-ESTABLISHMENT FOR A DUAL MODE TELEPHONE

(75) Inventor: John R. Bell, Fremont, CA (US)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,591

(22) Filed: Dec. 20, 1999

(51) Int. Cl.[7] ................................................. H04Q 7/20
(52) U.S. Cl. ........................ 455/426; 455/414; 455/436; 455/435; 455/456
(58) Field of Search ................................. 455/426, 456, 455/461, 435, 414, 466, 434; 379/27

(56) References Cited

U.S. PATENT DOCUMENTS

| | | | | |
|---|---|---|---|---|
| 4,661,972 A | * | 4/1987 | Kai ............................. | 379/57 |
| 4,893,327 A | * | 1/1990 | Stern et al. .................... | 379/59 |
| 4,901,307 A | * | 2/1990 | Gilhousen et al. ............. | 370/18 |
| 5,127,042 A | * | 6/1992 | Gillig et al. ................... | 379/59 |
| 5,222,248 A | * | 6/1993 | Mcdonald et al. .......... | 455/33.2 |
| 5,463,674 A | * | 10/1995 | Melampy et al. ........... | 379/201 |
| 5,566,236 A | * | 10/1996 | Melampy et al. ........... | 379/201 |
| 5,649,308 A | * | 7/1997 | Andrews .................... | 370/334 |
| 5,673,308 A | * | 9/1997 | Akhavan ..................... | 379/61 |
| 5,878,344 A | * | 3/1999 | Zicker ......................... | 455/426 |
| 5,930,712 A | | 7/1999 | Byrne et al. ................. | 455/437 |
| 5,999,811 A | * | 12/1999 | Molne ......................... | 455/432 |
| 6,327,470 B1 | * | 12/2001 | Ostling ........................ | 455/437 |

FOREIGN PATENT DOCUMENTS

| | | | |
|---|---|---|---|
| EP | 0212761 A2 | 3/1987 | ............ H04Q/7/04 |
| EP | 0793395 A2 | 2/1996 | |
| WO | WO9811743 | 3/1998 | ............ H04Q/7/22 |
| WO | WO9925146 | 11/1998 | |

OTHER PUBLICATIONS

PCT, PHA23.879WO, PCT/EP 000/12254, Filing Date: Aug. 14, 2001.

* cited by examiner

*Primary Examiner*—Vivian Chin
*Assistant Examiner*—Marceau Milord
(74) *Attorney, Agent, or Firm*—Gwenaelle Le Pennec

(57) ABSTRACT

A wireless communication device is disclosed for establishing communication with a remote terminal device through a cordless or a mobile base station. The wireless communication device has a cordless section and a mobile section. The cordless section is for communicating with a remote terminal device through the cordless base station in a cordless mode used for a cordless call. The mobile section is for communicating with the remote terminal device through the mobile base station in a mobile mode used for a mobile call. A processor of the wireless communication device detects a drop of a current call using the cordless service, for example, and re-establishes the communication using the mobile service. The user may be prompted prior to call re-establishment. For outgoing calls, the last dialled number is stored and re-dialled for call re-establishment. For incoming calls, the caller ID is used for call re-establishment. When a cheaper service is detected during a call, the user is prompted and invited to use the cheaper service.

32 Claims, 3 Drawing Sheets

CALL RE-ESTABLISHMENT FOR A DUAL MODE TELEPHONE

BACKGROUND OF THE INVENTION

1. Field of the Invention

The present invention is directed to a dual mode cellular and cordless telephone and method for semi-automatic hand-over of calls between the two modes, and more particularly, to a dual mode telephone and method where dropped calls are re-established by the telephone without data from base stations or networks.

2. Discussion of the Prior Art

Wireless systems include PCS (Personal Communication System) or cellular and cordless systems. Examples of PCS/Cellular systems are AMPS (Advanced Mobile Phone Service), GSM (Global System for Communications), TDMA (Time Domain Multiple Access), CDMA (Code Division Multiple Access). Examples of cordless systems are DECT (Digital European Cordless Telephone System), FM (Frequency Modulation), spread spectrum, and the Bluetooth telephony profile. All systems comprise a handset and a base station. However PCS/cellular systems are nationwide, where the base stations serve many calls at the same time, and the distance between the handset and base station can be several miles. By contrast, cordless systems cover shorter distances and are typically for indoor use, such as in a home or office. Cordless base stations can support more than one handset, but the range is typically less than 1000 feet.

Both PCS/cellular and cordless systems are in widespread use and both are convenient. There are some handsets that support both cordless and PCS/cellular functions, but they are expensive. Bluetooth is a new technology that permits short-range wireless voice and data links between devices. One such application is cordless. Thus, a PCS/cellular handset could add cordless functionality at a low cost using Bluetooth. Accordingly, the number of dual mode cordless and PCS/cellular handsets could increase significantly.

There is a need to roam between cordless and PCS/cellular systems. In dual mode systems, communication is necessary between a cordless base station and a PCS/cellular network to facilitate hand-over of calls between the two different systems. However, conventional systems and methods for call hand-over are expensive and difficult to implement since, for example, strength of signals between handsets and base stations are monitored and communication paths of current calls are stored by the network or base stations for hand-over of calls or re-establishment of calls in case of a dropped call. Accordingly, there is a need to provide a cost effective system and method for call hand-over between two different systems.

SUMMARY OF THE INVENTION

The object of the present invention is to provide a dual mode handset that eliminates the problems of conventional dual mode handsets.

The present invention accomplishes the above and other objects by providing a wireless communication device for establishing communication with a remote terminal device through a cordless or a mobile base station. The wireless communication device has a cordless section and a mobile section. The cordless section is for communicating with a remote terminal device through the cordless base station in a cordless mode used for a cordless call. The mobile section is for communicating with the remote terminal device through the mobile base station in a mobile mode used for a mobile call.

A processor of the wireless communication device detects a drop of a current call using the cordless service, for example, and re-establishes the communication using the mobile service. The user may be prompted prior to call re-establishment. For outgoing calls, the last dialed number is stored and re-dialed for call re-establishment. For incoming calls, the caller ID is used for call re-establishment. When a cheaper service is detected during a call, the user is prompted and invited to use the cheaper service.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
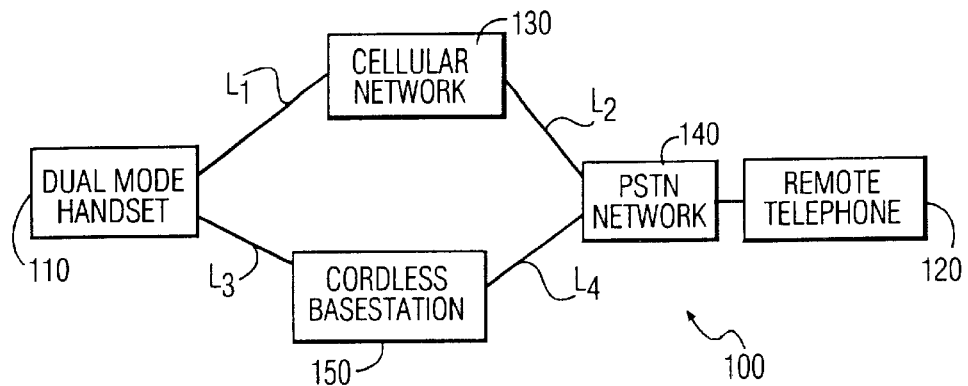
FIG. 1 shows a wireless communication system with a dual mode handset according to present invention.

FIG. 1 shows a wireless communication system 100 with a wireless or mobile dual mode handset 110 having a PCS or cellular mode for connection to a PCS/Cellular system and a cordless mode for connection to a cordless system. Illustratively, the PCS/Cellular systems may be AMPS, GSM, TDMA, or CDMA, and the cordless system may be DECT, FM, spread spectrum, or the Bluetooth telephony profile. The mobile and cordless modes or services are for illustrative purposes. It is understood by those skilled in the art that the handset 110 and communication system 100 can include any two modes or services.

In the cellular mode, the dual mode handset 110 is connectable to a remote telephone 120 through a cellular network 130, which includes at least one cellular base station, and a public switched telephone network (PSTN) 140. A cellular wireless link $L_1$ connects the dual mode handset 110 to the cellular network 130 through an air interface, and a wired link $L_2$ connects the cellular network 130 to a PSTN 140. In the cordless mode, the dual mode handset 110 is connectable to the remote telephone 120 through a cordless network 150, which includes at least one cordless base station, and the PSTN 140. A cordless wireless link $L_3$ connects the dual mode handset 110 to the cordless network 150 through the air interface, and a wired link $L_4$ connects the cordless network 150 to the PSTN 140.

Figure 2:
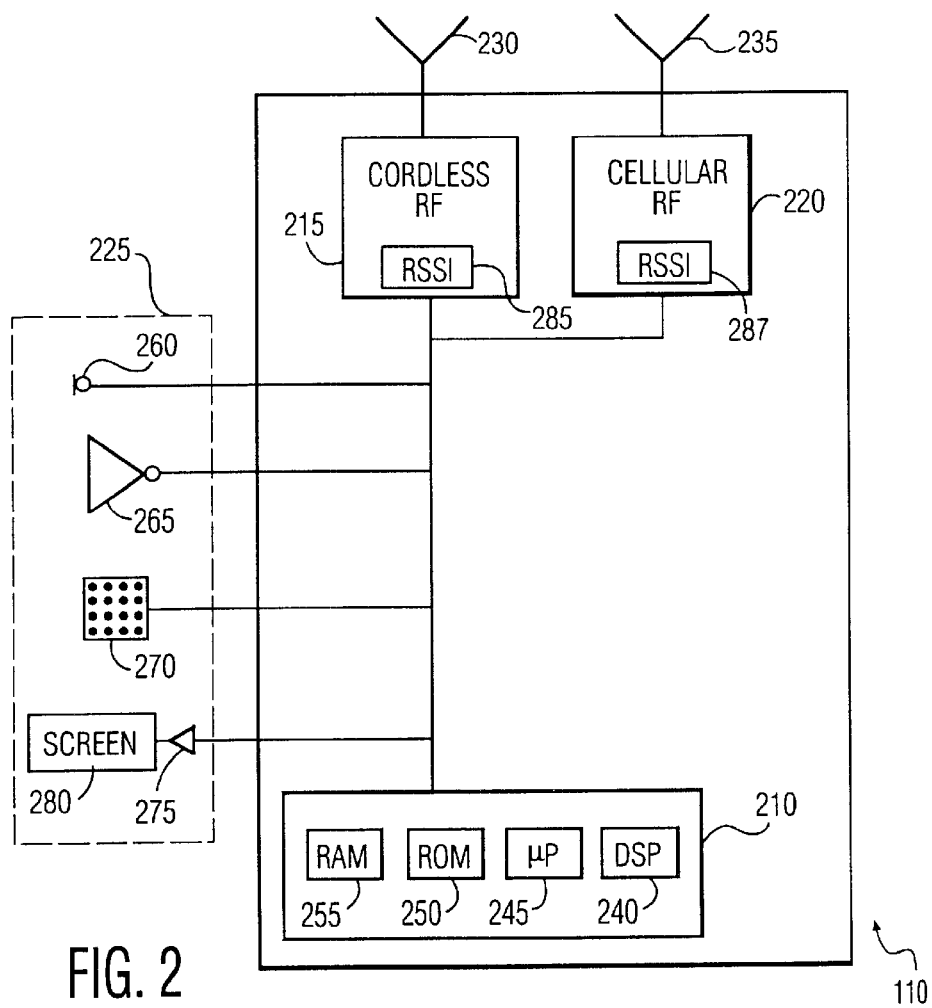
FIG. 2 shows a dual mode handset according to present invention.

The mobile handset 110 illustrated in FIG. 2 includes interconnected elements, such as a baseband section 210, a cordless RF (radio frequency) section 215, a cellular RF section 220 and a user interface 225. As is well known in the art, each RF section 215, 220 includes a transmitter and a receiver coupled to a respective antenna 230, 235 through a duplexer. The transmitter transmits signals provided from the baseband section 210 as follows. The baseband section 210 includes an encoder which provides digital signals to a D/A (digital to analogue) for conversion to analogue signals. The analogue signals are modulated by a modulator of the transmitter using an RF carrier signal from a voltage-controlled oscillator or a frequency synthesizer controlled by a microprocessor 245 of the baseband section 210. The modulated signals are amplified by a power amplifier of the transmitter and transmitted through the antenna.

The receiver includes a low noise amplifier (LNA) which receives modulated signals from the antenna. A demodulator demodulates the received signals using a proper RF carrier signal from the voltage-controlled oscillator or the frequency synthesizer. The demodulated signals are digitized by an A/D (analogue to digital) converter to provide digital baseband signals to a decoder of the baseband unit 210. Generally, at least the encoder and decoder are implemented by a digital signal processor (DSP) 240.

In addition to the DSP 240 and microprocessor 245, the baseband section 210 also includes a non-volatile memory or ROM (read only memory) 250, at least a portion of which is programmable. The ROM 250 stores firmware constituting programs and data for operation of the DSP 240 and the microprocessor 245, e.g., for steering the setup of a cellular or PCS/Cellular call, re-establishment of a dropped call, and for other operations of the mobile handset. The baseband section 210 also includes a volatile memory or random access memory (RAM) 255, for temporary storage in conjunction with program execution.

The user interface 225 includes a microphone 260, speaker 265, a numeric keypad 270, and a driver 275 for a display 280, e.g. a liquid crystal display (LCD) screen.

Each RF section 215, 220 further includes an RSSI function unit 285, 287 to detect received RSSI (Received Signal Strength Indicator) signals that indicate the strength of the received RF signals. Detection of the RSSI signals by the cordless and cellular RSSI units 285, 287 indicates availability of the corresponding cordless and cellular services.

The microprocessor 245 uses the RSSI signal to determine the presence or absence of signals received from base stations. If a signal received from a base station is detected, then the microprocessor 245 communicates with that base station using control signals. Illustratively, for an incoming call, the base station sends a command to the handset to ring. When the user answers, the handset sends a command to the base station to start the call. For an outgoing call, the handset sends a command to the base station to dial. The base station sends a command back to the handset with a dialing tone for inputting the phone number to be dialed.

Similar control signals between the handset and base station continue during a call, such as control signals to increase or decrease the RF transmit power. Each command results in an acknowledgment response. A dropped call takes place and is detected when a command is not acknowledged within a predetermined time, e.g., 2 seconds. Thus, communication inability between the handset and base station indicates a dropped call. Further, availability of a service is detected when the RSSI level indicates a signal and when some commands and responses have been exchanged to verify the service availability.

The mobile handset 110 is capable of receiving the telephone number of a caller, commonly referred to as the caller ID, as is well known in the art. Further, the mobile handset 110 is capable of switching between PCS/cellular and cordless modes to be able to use the least costly available service and to roam over large distances. This is achieved by semi-automatic or user initiated handover between PCS/cellular and cordless systems. In particular, the mobile handset 110 includes three features, namely, managing dropped calls on an outgoing call, managing dropped calls on an incoming call, and user initiated handover.

Managing Dropped Calls on an Outgoing Call

Figure 3:
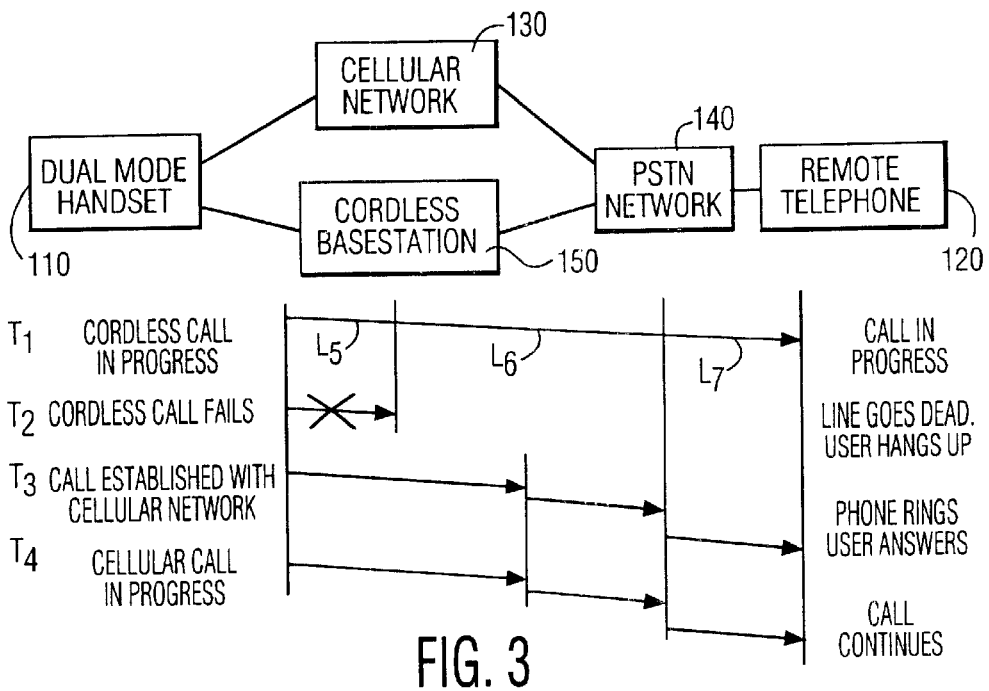
FIG. 3 shows a signaling diagram for managing dropped calls on an outgoing call according to present invention.

FIG. 3 is an exemplary signalling diagram showing a sequence of events $t_1-t_4$ for managing dropped outgoing calls. The current outgoing call at time $t_1$ is shown in FIG. 3 to be a cordless call, however it is understood that the current call in FIGS. 3–5 may be either a cordless call or a cellular call and the dual mode mobile phone is switchable between the cordless and cellular modes.

For outgoing calls in progress, if the current service fails (dropped call) and the other service is available, e.g. by detecting signals with the RSSI units 285, 287, then automatic re-dial is initiated for the available service using the previously dialed number, which is stored in the handset memory, such as in the RAM 255 (FIG. 2). Alternatively, the user is first prompted whether to automatically re-dial the previously dialed number using the available service.

As shown in FIG. 3, at time $t_1$, a cordless call is established and in progress by the dual mode handset 110, through a cordless first link $L_5$ between the handset 110 and the cordless base station 150, a second link $L_6$ between the cordless base station 150 and the PSTN 140, and a third link $L_7$ between the PSTN 140 and the remote telephone 120.

At time $t_2$, the user of the dual mode handset 110 experiences a dropped call resulting from failure of the cordless first link $L_5$, for example, due to moving out of range of the cordless base station 150. At this time $t_2$, the line goes dead and the call recipient at the remote telephone 120 hangs up.

At time $t_3$, the handset 110 recognizes that the call failure is due to a failure of the cordless first link $L_5$ between the handset 110 and the cordless base-station 150. For example, the link $L_5$ failure is be detected by the microprocessor 245 (FIG. 2) when the handset 110 can no longer communicate with the base station for exchanging control or other signals.

In response to the detection of the failed link $L_5$, the handset 110 automatically redials the last dialed number using the alternative network, which is the PCS/cellular network 130 when the dropped call is a cordless call. Illustratively, the last dialed number is stored in the temporary memory RAM 255 of the handset 110 shown in FIG. 2. The automatic redialing occurs without user intervention if desired. Alternatively, the user may be prompted and asked if the call should be re-established by a visual message displayed on the screen 280 (FIG. 2) and/or an audio tone or a voice message provided through the speaker 265. The call is re-established in response to a positive response from a user, such as depressing a single key on the keypad 170. At time $t_4$, a cellular call is in progress. The call re-establishment is very fast and takes place within a few seconds.

The microprocessor 245 of the dual mode mobile handset 110 may be pre-programmed so that the cheapest service (e.g., cordless or cellular) is the default mode. This programming could be a factory setting or set by the user. Thus, the default mode can be changed by the user. So when making a call and both the cellular and cordless services are available, e.g., as indicated by the RSSI levels received from both the cellular and cordless base stations 130, 150, the cheapest service is automatically chosen when a telephone number is dialed.

Further, if both the cellular and cordless services are available, the user may override the default selection prior to dialing a number. For example, if the caller is leaving the coverage area of the cordless base station 150, e.g., the place of residence or business, the caller knows that the cordless service will not be available for long. Therefore, the user can force the handset not to dial using the default/cheaper cordless service, but to dial using the cellular service and place a cellular call.

Managing Dropped Calls on an Incoming Call

Figure 4:
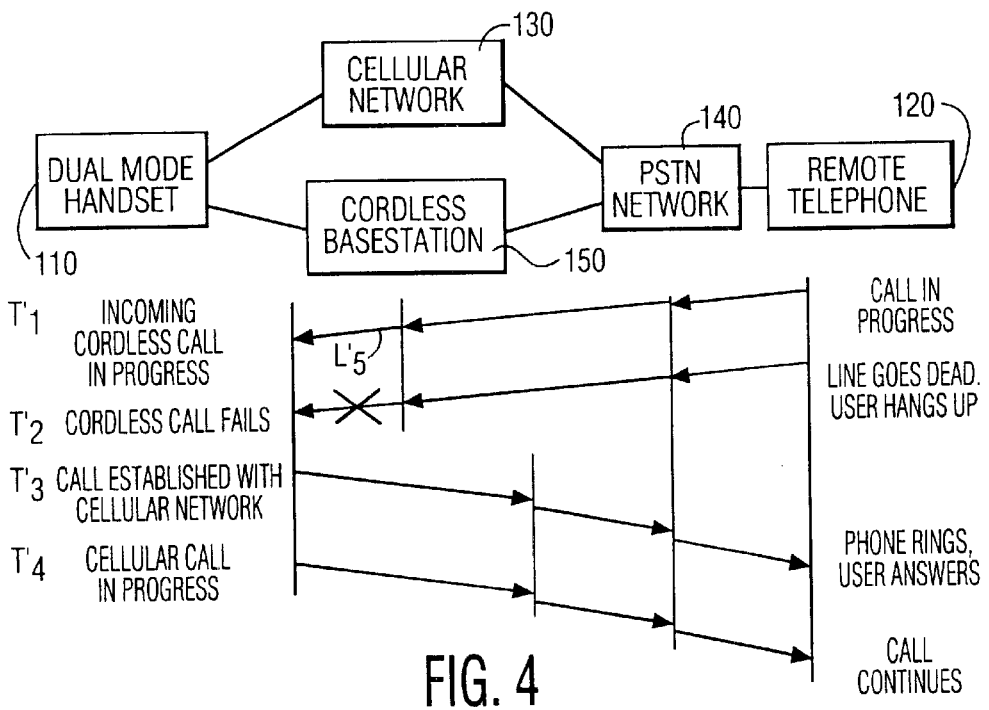
FIG. 4 shows a signaling diagram for managing dropped calls on an incoming call according to present invention.

FIG. 4 is an exemplary signaling diagram showing a sequence of events $t_1$–$t_4$ for managing dropped incoming calls. For example, the current incoming call at time $t_1$, is a cordless call received by the handset 110 from the cordless base station 150 through a cordless first link $L_5$, after a call is made on the remote telephone 120 and received by the cordless base station 150 through the PSTN 140. If the current service, e.g., cordless service, fails (dropped call) and the other service, e.g., PCS/cellular service, is available, the handset may be configured for automatic re-dialing to re-establish the call using data from the caller ID which is stored in the handset memory, such as in the RAM 255. Alternatively, the handset 110 prompts the user for call re-establishment and dials the caller ID in response to a positive response from the user.

In particular, at time $t_2$, the user of the dual mode handset 110 experiences a dropped call resulting from failure of the cordless first link $L_5$, for example, due to moving out of range of the cordless base station 150. At this time $t_2$, the line goes dead and the remote caller at the remote telephone 120 hangs up.

At time $t_3$, the handset 110 recognizes that the call failure is due to a failure of the cordless first link $L_5$ between the handset 110 and the cordless base-station 150. For example, the link $L_5$ failure is detected by the loss of communication between the handset and the corresponding base station, as previously described.

In response to the detection of the failed link $L_5$, the handset 110 automatically redials the telephone number included in the caller ID using the alternative network, which is the PCS/cellular network 130 when the dropped call is a cordless call. The automatically redials occurs without user intervention if desired. Alternatively, the user may be prompted and asked if the call should be re-established using a video and/or an audio message as previously described. The call is re-established in response to a positive response from the user, such as depressing the single key on the keypad 170 (FIG. 2). At time $t_4$, a cellular call is in progress. The call re-establishment is very fast and takes place within a few seconds. If caller ID is not available, the user is prompted to enter the number to call back and re-establish the dropped call.

In this case where the dropped call is an incoming call, the cost of the call moves from the originator at the remote telephone 120 to the user of the dual mode handset 110. Therefore, even if caller ID is available, it is preferable that the user be prompted prior for automatic re-dial, e.g., by displaying on the screen 280 (FIG. 2) an appropriate message such as 'Re-establish call? Yes/No'.

User Initiated Handover

The user is prompted that the alternate service, e.g., the cheaper service, is now available and is invited to change service.

Figure 5:
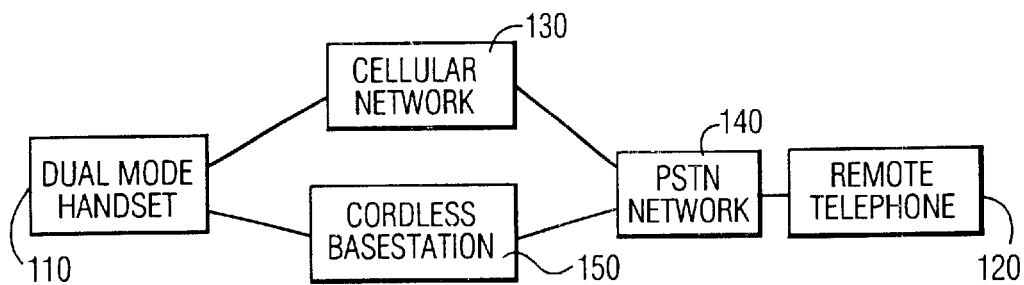
FIG. 5 shows a signaling diagram for user initiated change of service according to present invention.
Figure 5:
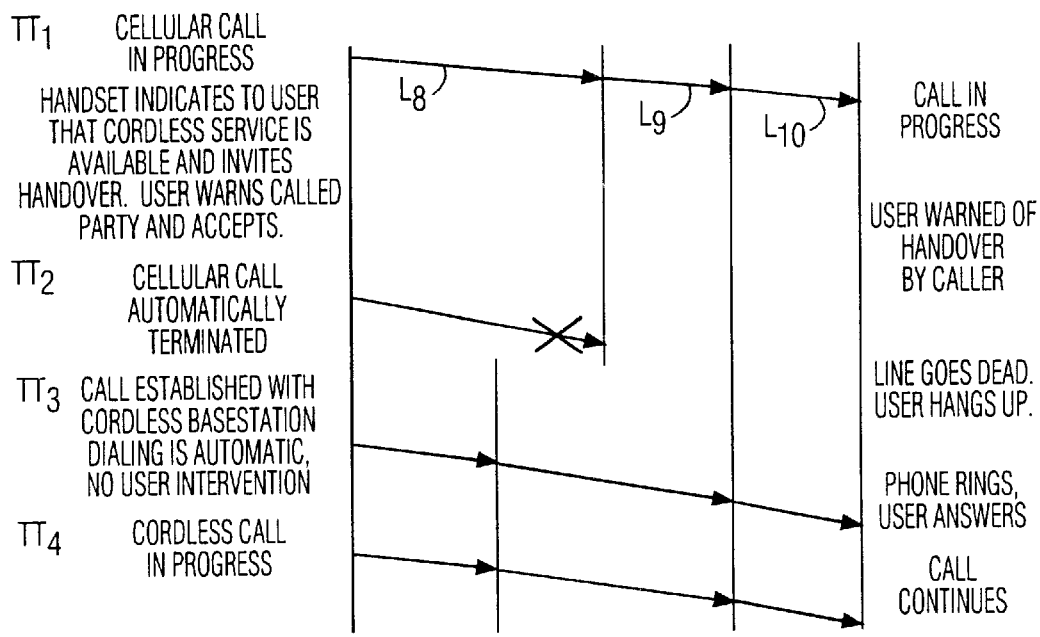

FIG. 5 is an exemplary signaling diagram showing a sequence of events $tt_1$ to $tt_4$ for user initiated handover of calls from a cellular system to a cordless system. Of course if desired, the handset (e.g., its microprocessor) may also be programmed for user initiated handover of calls from a cordless system to a cellular system.

At time $tt_1$, an outgoing cellular call is in progress initiated by the handset 110. Although FIG. 5 is directed to an outgoing cellular call, the following description is equally applicable for an incoming cellular call, as well as for an incoming call, whether cellular or cordless. As shown in FIG. 5, the cellular call is connected to the remote telephone 120 through a first cellular link $L_8$ between the handset 110 and the cellular base station 130, a second cellular link $L_9$ between the cellular base station 130 and the PSTN, and another link $L_{10}$ between the PSTN and the remote telephone 120.

At time $tt_2$, the microprocessor 245 (FIG. 2) of the handset 110 detects that the alternate service becomes available, e.g., the cheaper cordless service, such as when the handset 110 is within range of the cordless base station 150. The handset 110 invites the user to hand-over the call to the cheaper service using a video and/or audio message as previously described. The user warns the remote party verbally that the current call will be dropped and re-established, and accepts the invitation, for example, by depressing a single key on the keypad 270 (FIG. 2).

At time $tt_3$ and in response to the acceptance of the user to use the cheaper cellular service, the handset 110 hangs up and drops the current cellular call, and automatically redials using the cellular system. Next, the remote telephone 120 rings and is answered by the remote user. This establishes a cellular call between the handset 110 and the remote telephone 120. At time $tt_4$, a cordless call is in progress.

This call switching from a more expensive service, e.g., a cellular call, to a less expensive service, e.g., a cordless call, is very fast and takes place within a few seconds. It should be noted that in this illustrative example, it is assumed that the cordless service is cheaper than the cellular service. However, it is understood that any cheaper service may be chosen. Thus, the user-initiated handover may also be performed for switching cellular calls to cordless calls.

Note that the previously described events, such as the dropped calls and moving into range of a cheaper system, would typically cause a user to perform the above described actions manually if call re-establishment is desired. Therefore, the above described features of the dual mode mobile handset provide convenience and value to the user to automatically perform actions quickly that otherwise would have been performed manually requiring longer periods of time for call re-establishment. Further, battery life (before requiring a charge) of the dual mode mobile handset is extended since there is no need for extended simultaneous operation of both the cellular and cordless modes, as well as no need for power consuming signal strength evaluations.

The dual mode handset re-establishes dropped calls quickly and without requiring any input data or from the cordless or cellular base stations. The dropped call is re-established without any data about the dropped call stored in the base stations. For example, there is no need for the base stations to store the links of the current call in case it is dropped. Further, there is no need to monitor the strength of signals for call hand-over. Instead of call hand-over, the call is re-established when it is dropped.

While the present invention has been described in particular detail, it should also be appreciated that numerous modifications are possible within the intended spirit and scope of the invention. In interpreting the appended claims it should be understood that:

a) the word "comprising" does not exclude the presence of other elements or acts than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A wireless communication device for establishing communication with a remote terminal device through one of a cordless base station and a cellular base station comprising:

a cordless section for communicating with said remote terminal device through said cordless base station in a cordless mode used for a cordless call;

a cellular section for communicating with said remote terminal device through said cellular base station in a cellular mode used for a cellular call;

a processor which detects a drop of a current call being one of said cordless call and said cellular call and re-establishes said communication using another of said cordless base station and said cellular base station, said processor being configured to prompt a user of said wireless communication device whether to re-establish said communication.

2. The wireless communication device of claim 1, wherein said drop of said current call is detected when a loss of connection to said remote terminal is detected.

3. The wireless communication device of claim 1, wherein said communication is re-established without data from said cordless base station and said cellular base station.

4. The wireless communication device of claim 1, wherein said communication is re-established without knowledge of links of said current call between said wireless communication device and said remote terminal device.

5. The wireless communication device of claim 1, further comprising a memory which stores an identification code of said current call, and wherein said processor redials said identification code to re-establish said communication.

6. The wireless communication device of claim 5, wherein said identification code is a last dialed telephone number when said current call is an outgoing call; and when said current call is an incoming call, said identification code is one of a caller identification received by said wireless communication device and a user entered number when said caller identification is not received by said wireless communication device.

7. The wireless communication device of claim 5, wherein said processor redials said identification code upon detection of said drop of said current call.

8. The wireless communication device of claim 1, wherein said processor has a default setting that selects one of said cordless base station and said cellular base station for an outgoing call.

9. The wireless communication device of claim 8, wherein said default setting is changeable.

10. A wireless communication device for establishing communication with a remote terminal device through one of a cordless base station and a cellular base station comprising:

a cordless section for communicating with said remote terminal device through said cordless base station in a cordless mode used for a cordless call;

a cellular section for communicating with said remote terminal device through said cellular base station in a cellular mode used for a cellular call;

a processor which detects a drop of a current call being one of said cordless call and said cellular call and re-establishes said communication using another of said cordless base station and said cellular base station, said processor being configured to detect a cheaper link than said current call that connects said wireless communication device to said remote terminal device, said cheaper link being provided through one of said cordless base station and said cellular base station, and said processor being configured to prompt a user of said wireless communication device whether to terminate said current call and re-establish said communication using said cheaper link.

11. The wireless communication device of claim 10, wherein said drop of said current call is detected when a loss of connection to said remote terminal is detected.

12. The wireless communication device of claim 10, wherein said communication is re-established without data from said cordless base station and said cellular base station.

13. The wireless communication device of claim 10, wherein said communication is re-established without knowledge of links of said current call between said wireless communication device and said remote terminal device.

14. The wireless communication device of claim 10, further comprising a memory which stores an identification code of said current call, and wherein said processor redials said identification code to re-establish said communication.

15. The wireless communication device of claim 14, wherein said identification code is a last dialed telephone number when said current call is an outgoing call; and when said current call is an incoming call, said identification code is one of a caller identification received by said wireless communication device and a user entered number when said caller identification is not received by said wireless communication device.

16. The wireless communication device of claim 14, wherein said processor redials said identification code upon detection of said drop of said current call.

17. The wireless communication device of claim 10, wherein said processor has a default setting that selects one of said cordless base station and said cellular base station for an outgoing call.

18. The wireless communication device of claim 17, wherein said default setting is changeable.

19. A method for establishing a communication between a wireless communication device and a remote terminal comprising:

establishing a current call between said wireless communication device and said remote terminal through one of a cordless base station and a cellular base station;

detecting a drop of said current call; and re-establishing said communication using another of said cordless base station and said cellular base station, said re-establishing including prompting a user of said wireless communication device whether to re-establish said communication; and re-establishing said communication in response to a positive response from said user.

20. The method of claim 19, wherein the detecting act is performed without communicating with said cordless base station and a cellular base station.

21. The method of claim 19, wherein the re-establishing act is performed without data from said cordless base station and said cellular base station.

22. The method of claim 19, wherein the re-establishing act is performed without knowledge of links of said current call between said wireless communication device and said remote terminal.

23. The method of claim 19, wherein the re-establishing act includes storing in a memory of said wireless communication device an identification code of said current call, and redialling said identification code to re-establish said communication.

24. The method of claim 23, wherein said identification code is a last dialed telephone number when said current call is an outgoing call; and when said current call is an incoming call, said identification code is one of a caller identification received by said wireless communication device and a user entered number when said caller identification is not received by said wireless communication device.

25. The method of claim 23, wherein the redialling act is performed upon detection of said drop of said current call.

26. A method for establishing a communication between a wireless communication device and a remote terminal comprising:

establishing a current call between said wireless communication device and said remote terminal through one of a cordless base station and a cellular base station;

detecting a drop of said current call; and re-establishing said communication using another of said cordless base station and said cellular base station, said re-establishing including detecting a cheaper link than said current call that connects said wireless communication device to said remote terminal, said cheaper link being provided through one of said cordless base station and said cellular base station; and said re-establishing further including prompting a user of said wireless communication device whether to terminate said current call and re-establish said communication using said cheaper link.

27. The method of claim 26, wherein the detecting act is performed without communicating with said cordless base station and a cellular base station.

28. The method of claim 26, wherein the re-establishing act is performed without data from said cordless base station and said cellular base station.

29. The method of claim 26, wherein the re-establishing act is performed without knowledge of links of said current call between said wireless communication device and said remote terminal.

30. The method of claim 26, wherein the re-establishing act includes storing in a memory of said wireless communication device an identification code of said current call, and redialling said identification code to re-establish said communication.

31. The method of claim 30, wherein said identification code is a last dialed telephone number when said current call is an outgoing call; and when said current call is an incoming call, said identification code is one of a caller identification received by said wireless communication device and a user entered number when said caller identification is not received by said wireless communication device.

32. The method of claim 31, wherein the redialling act is performed upon detection of said drop of said current call.

* * * * *